(12) United States Patent
Bonnelye et al.

(10) Patent No.: US 9,360,848 B2
(45) Date of Patent: Jun. 7, 2016

(54) REVERSE-OSMOSIS WATER DESALINATION PLANT

(75) Inventors: Véronique Bonnelye, Conflans (FR); Eric Fievez, Suresnes (FR)

(73) Assignee: DEGREMONT (FR)

( * ) Notice: Subject to any disclaimer, the term of this patent is extended or adjusted under 35 U.S.C. 154(b) by 77 days.

(21) Appl. No.: 13/054,835

(22) PCT Filed: Jul. 16, 2009

(86) PCT No.: PCT/FR2009/000873
§ 371 (c)(1),
(2), (4) Date: Mar. 8, 2011

(87) PCT Pub. No.: WO2010/010243
PCT Pub. Date: Jan. 28, 2010

(65) Prior Publication Data
US 2011/0147285 A1   Jun. 23, 2011

(30) Foreign Application Priority Data

Jul. 21, 2008 (FR) ...................................... 08 04140

(51) Int. Cl.
*B01D 35/00* (2006.01)
*B01D 63/00* (2006.01)
(Continued)

(52) U.S. Cl.
CPC .......... *G05B 13/0205* (2013.01); *B01D 61/025* (2013.01); *B01D 61/04* (2013.01);
(Continued)

(58) Field of Classification Search
USPC .............................................. 700/28, 29, 30
See application file for complete search history.

(56) References Cited

U.S. PATENT DOCUMENTS

| 4,983,305 | A | * | 1/1991 | Oklejas et al. | ................. 210/642 |
| 5,049,045 | A | * | 9/1991 | Oklejas et al. | ................. 417/365 |

(Continued)

FOREIGN PATENT DOCUMENTS

| WO | WO-9816289 A | 4/1998 |
| WO | WO-0209855 A | 2/2002 |

(Continued)

OTHER PUBLICATIONS

Geisler P. et al., "Reduction of the energy demand for seawater RO with the pressure exchange systems PES", Desalination, Elsevier, Amsterdam, NL, vol. 135, No. 1-3, Apr. 20, 2001, pp. 205-210.

(Continued)

*Primary Examiner* — Nam Nguyen
*Assistant Examiner* — Richard Gurtowski
(74) *Attorney, Agent, or Firm* — The Belles Group, P.C.

(57) ABSTRACT

The invention relates to a reverse-osmosis water desalination plant comprising: a reverse-osmosis membrane unit (TP); at least one high-pressure pump (HP); a pressure-exchange-type energy collector (SRE) capable of transferring pressure from the concentrate leaving the membrane unit to a portion of the water to be treated; sensors for various operating parameters, in particular pressure, flow rate, temperature and salinity level, said sensors being provided at suitable locations; and control loops so that the various adjustable elements are maintained at a setpoint value. The plant also includes a secondary control system (D) comprising calculation means (26) programmed to determine, on the basis of the operating conditions of the plant supplied by the sensors, a combination of setpoint values for the flow rate of the high-pressure pump, the mixing ratio of the energy collector and the conversion ratio, which combination minimizes the energy consumption of the high-pressure pump.

10 Claims, 3 Drawing Sheets

(51) Int. Cl.
*G05B 13/02* (2006.01)
*B01D 61/02* (2006.01)
*B01D 61/04* (2006.01)
*B01D 61/06* (2006.01)
*B01D 61/10* (2006.01)
*B01D 61/12* (2006.01)
*B01D 61/58* (2006.01)
*B01D 65/02* (2006.01)
*C02F 1/44* (2006.01)
*B01D 61/14* (2006.01)
*C02F 1/00* (2006.01)
*C02F 103/08* (2006.01)

(52) U.S. Cl.
CPC .............. *B01D 61/06* (2013.01); *B01D 61/10* (2013.01); *B01D 61/12* (2013.01); *B01D 61/58* (2013.01); *B01D 65/02* (2013.01); *C02F 1/441* (2013.01); *B01D 61/145* (2013.01); *B01D 2311/10* (2013.01); *B01D 2311/14* (2013.01); *B01D 2311/16* (2013.01); *B01D 2311/246* (2013.01); *B01D 2311/2649* (2013.01); *B01D 2321/16* (2013.01); *C02F 1/008* (2013.01); *C02F 2103/08* (2013.01); *C02F 2209/02* (2013.01); *C02F 2209/03* (2013.01); *C02F 2209/05* (2013.01); *C02F 2209/40* (2013.01); *C02F 2303/10* (2013.01); *Y02W 10/30* (2015.05)

(56) References Cited

U.S. PATENT DOCUMENTS

| | | | | |
|---|---|---|---|---|
| 5,207,916 | A | * | 5/1993 | Goheen et al. ................ 210/637 |
| 6,139,740 | A | * | 10/2000 | Oklejas .................... 210/321.66 |
| 6,332,110 | B1 | * | 12/2001 | Wolfe ............................ 702/22 |
| 2004/0109788 | A1 | | 6/2004 | Li et al. |
| 2004/0173528 | A1 | | 9/2004 | Herrington et al. |

FOREIGN PATENT DOCUMENTS

| | | | | |
|---|---|---|---|---|
| WO | WO2006/079483 | * | 8/2006 | ............... C02F 1/16 |
| WO | WO-2006079483 | A | 8/2006 | |
| WO | WO-2006106158 | A | 10/2006 | |
| WO | WO2007/045015 | * | 4/2007 | ............ B01D 29/00 |
| WO | WO-2007041823 | A | 4/2007 | |

OTHER PUBLICATIONS

Alatiqi I. et al., "Process control in water desalination industry: an overview", Desalination, Elsevier, Amsterdam, NL, vol. 126, No. 1-3, Nov. 1, 1999, pp. 15-32.

Krause H. et al., "Improvement of operation and availability of MSF plants", Desalination, Elsevier, Amsertdam, NL, vol. 107, No. 1, Sep. 1, 1996, pp. 59-74.

* cited by examiner

REVERSE-OSMOSIS WATER DESALINATION PLANT

CROSS REFERENCE TO RELATED APPLICATIONS

This application is a National Phase filing under 35 U.S.C. §371 of PCT/FR2009/000873 filed on Jul. 16, 2009; and this application claims priority to Application No. 0804140 filed in France on Jul. 21, 2008 under 35 U.S.C. §119; the entire contents of all are hereby incorporated by reference.

The invention relates to a reverse-osmosis water desalination plant like those which comprise:
- a reverse-osmosis membrane unit,
- at least one high-pressure pump for taking the water to be treated to a pressure higher than its osmotic pressure and sending it to the inlet of the membrane unit,
- a means for adjusting the flow rate of the high-pressure pump, this means comprising an adjustable valve installed on the outlet of the pump and/or a drive motor for driving the pump at variable speed,
- an energy collector of the pressure-exchange type suitable for transferring the pressure of the concentrate leaving the membrane unit to all or a portion of the water to be treated, this collector comprising a means for adjusting the concentrate/water-to-be-treated mixture ratio sent to the inlet of the membrane unit, optionally by a booster pump, and an adjustable valve installed at the outlet of the collector for the concentrate, making it possible to adjust the conversion rate,
- sensors of various operating parameters, in particular pressure, flow rate, temperature, salinity ratio, provided in appropriate locations,
- and control loops so that the various adjustable elements are maintained at a setpoint value.

In a reverse-osmosis water desalination plant, the energy consumption of the high-pressure pumps accounts for approximately two-thirds of the energy consumption and approximately 20% of the operating cost.

Reverse-osmosis desalination uses the pressurization of the salt liquid to above its osmotic pressure in order to allow only water (without the dissolved salts) to permeate a semipermeable membrane. The salt compartment fills with salt. The filtrate compartment is fed with water relieved of the majority of its salts. The semi-permeable membrane is characterized by its rejection of salts (or passage of salt expressed as %) and by its water-permeability defined at a given temperature, usually 25° C. The system, continuously fed with salt water, typically seawater, makes it possible to continuously collect freshwater relieved of its salts on the filtrate side of the membrane and a concentrated solution on the concentrate side of the membrane.

The conversion ratio is defined as being the ratio of the flow rate of filtrate to the total feed flow rate of the membrane, and makes it possible to characterize the hydraulic operation of the plant.

The reverse-osmosis membrane is applied in modules of the spiral-wound, capillary or tubular type, the modules being arranged in pressure tubes, in parallel and in series-discharge arrangement. The feed water is pressurized by a high-pressure pump or equivalent means.

The main operating parameters are measured by means of flow-rate, pressure, conductivity, temperature sensors. They relate to the pretreated water feeding the plant, the filtrate and the concentrate leaving the plant.

The energy-collector systems are used in order to collect the energy still present in the concentrate on leaving the reverse-osmosis membranes. The energy collectors can be of the hydraulic or positive-displacement type. Mention is made typically of a Pelton or Francis turbine coupled directly or indirectly to the feed pump, or to positive-displacement systems of the ERI PX, or Calder DWEER or KSB type, or other similar systems. In these latter cases, the pressurized concentrate transfers its pressure to a portion of the feed water by direct or indirect contact.

Knowing the energy balance of the process makes it possible to choose the equipment and design the plants taking account of the energy parameter. This design is based on the assumptions of salinity, temperature and hydraulic conditions that are expected when the plant will be built and in operation. Once the plants are built, the input parameters vary in an uncontrolled manner, requiring the installation of control loops in order to keep the system stable. Such control loops are provided for:
- the control of the flow rate of filtrate: in order to compensate for the fluctuations of temperature, salinity, aging and clogging of the reverse-osmosis membranes, an adjustment of flow rate makes it possible to correct the pressure applied at the membrane inlet, increasing or reducing the effective pressure in order to maintain a filtrate flow-rate setpoint,
- an adjustment of the conversion ratio of the system: in order to maintain the conversion ratio at a setpoint value, the flow rates of feed water to be treated and of the filtrate (and/or of the concentrate) are measured, the conversion computed and the flow rate of concentrate adjusted with the aid of the adjustable valve provided at the outlet of the energy collector;
- the control of the energy collector. The energy collectors are adjusted so as to control, usually by means of a pressurization pump, the flow of concentrate and of the pretreated water in flow-rate conditions in tune with the setpoints.

The setpoints inserted on the basis of salinity, temperature and hydraulic-condition assumptions are essentially designed to make it possible to satisfy the guaranteed conditions for the production volume and quality of the water produced, without taking account of energy consumption.

The main object of the invention is to provide a reverse-osmosis water desalination plant which makes it possible to minimize the energy consumption of the system in its entirety, within limits that are the guarantees of the quantities and qualities of water produced.

The invention consists in reversing the priorities of control of the desalination plant to the benefit of energy consumption. The principle of the invention consists in providing the whole of the high-pressure stage of the reverse-osmosis plant with a secondary adjustment that has the objective of reducing the energy consumption of the system.

According to the invention, a reverse-osmosis water desalination plant of the kind defined above is characterized in that it comprises:
- a secondary adjustment comprising computing means programmed to determine, based on the operating conditions of the plant supplied by the sensors, a combination of setpoint values for:
  - the flow rate of the high-pressure pump,
  - the mixture ratio of the energy collector,
  - the conversion ratio,
  - if necessary the temperature of the feed water (if there are several sources of untreated water),
  - if necessary the salinity of the feed water (if there are several sources of untreated water) which makes it possible to minimize the energy consumption of the system, these setpoint values being situated within limits ensuring the quantities and qualities of water produced and the behavior of the equipment, and means of connection between the outlets of the secondary adjustment and the control elements in order to insert therein these setpoint values.

Advantageously, the computation means of the secondary adjustment, in order to determine the three optimal setpoints (pump HP flow rate, mixture ratio of the energy collector, conversion ratio) minimizing the electric power consumed in reverse osmosis, are programmed to:

execute, at regular intervals, a search for the optimal combination of the three setpoints by dividing each of the possible variation fields of the three setpoints into n possible values;

carry out the theoretical computation of the consumed power with the measured operating parameters and the n*n*n (n to the power of 3) combination possibilities of the three setpoints, and the combination of the setpoints giving the minimal theoretical power is adopted and applied to the system.

The program of the computation means may comprise an additional loop of the main logic loop for comparing the theoretical result obtained with the actual consumption measured on the system, and, if there is a considerable difference, an alarm is emitted, leading to a verification of the equipment of the process or, at regular intervals, to a resetting of the computation formulas taking account of the change in the characteristics of the equipment relative to their assigned values that were used to establish the initial computation formula.

The plant may comprise at least two sources of salt water having different salinity ratios and/or temperatures, and an adjustable valve for adjusting a mixture of the resources. In this case, advantageously, the computation means of the secondary adjustment are programmed to determine an optimal setpoint value for the mixture ratio of the various sources of salt water in order to reduce the energy consumption, this setpoint value being applied to the adjustable valve of the mixture.

The computation means of the secondary adjustment may be programmed to determine the permeability of the membrane based on the flow-rate, inlet-water pressure, temperature and salinity-ratio parameters of the pretreated water, of the filtrate and of the concentrate, and to emit an indication or an alarm when the permeability falls below a limit requiring a cleaning or a replacement in order to minimize the use of energy.

The computation means of the secondary adjustment are preferably programmed to take account of the efficiency and performance curves of all of the equipment of the plant, in particular the pump, membrane and energy collector. The efficiency and performance curves taken into account are both theoretical and measured, in particular when the plant is commissioned.

The secondary adjustment comprises inputs at least for the following parameters:

water temperature at the inlet,
salinity ratio of the water to be treated,
flow rates of the water to be treated at the inlet of the high-pressure stage, at the inlet of the high-pressure pump, at the inlet of the booster pump, at the outlet of the high-pressure stage, at the discharge of the concentrate;
pressures at the inlet of the high-pressure pump, at the inlet of the high-pressure membranes, at the inlet of the booster pump, at the outlet of the high-pressure stage (of the filtrate and of the concentrate), at the discharge of the concentrate;
flow rate and pressure of the filtrate leaving the membrane unit,
pressure at the inlet of the membrane unit,
active power and electric energy consumed by the high-pressure pump.

The computation means of the secondary adjustment may be programmed according to a mode system which makes it possible to give priority to the responses of the control and to its action on the plant according to the local constraints: priority to flow rate of filtrate, or priority to flow rate of pretreatment, or priority to quality of treated water.

Apart from the arrangements explained above, the invention consists of a certain number of other arrangements which will be dealt with more explicitly below with reference to an exemplary embodiment which is described with reference to the appended drawings but which is in no way limiting. In these drawings.

Figure 1:
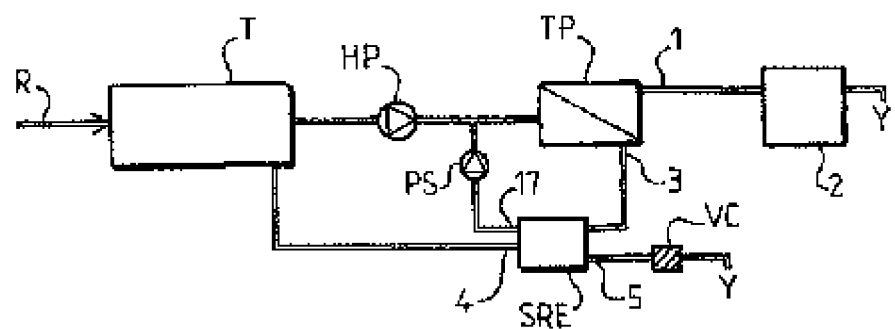
FIG. 1 is a simplified diagram of a water desalination plant.

With reference to FIG. 1 of the drawings, it shows a diagram of a reverse-osmosis plant which comprises:

a pretreatment unit T for the water to be treated originating from a resource R; the pretreatment unit may consist of ultrafiltration membranes, or of a two-layer filter or equivalent unit;

a high-pressure pump HP making it possible to pressurize a portion of the water being fed to the reverse-osmosis membranes, a reverse-osmosis membrane unit TP; this unit can be formed of a pressure tube containing several membranes, for example seven membranes, of the spiral-wound type, suitable for the treatment of seawater; the filtrate outlet 1 from the unit is connected to a tank for collecting the filtered water; the concentrate outlet 3 of the unit TP feeds an energy collector SRE of the pressure-exchange type.

The energy collector SRE comprises an inlet 4 fed by pretreated water, leaving the unit T, which is not pressurized. Usually the energy collector SRE comprises a booster pump PS installed on the line between an outlet 17 from the energy collector and the inlet of the membrane unit TP. The booster pump PS makes it possible to make up for the pressure losses associated with the flowing of the water in the concentrate circuit of the system SRE, which comprises an outlet 5 for the concentrate which is no longer pressurized. The outlet 5 is fitted with an adjustable control valve VC the positioning of which determines the conversion ratio of the plant, that is to say the ratio of the treated water (filtrate) flow rate at the outlet 1 to the flow rate of water to be treated entering the pretreatment unit T.

Figure 2:
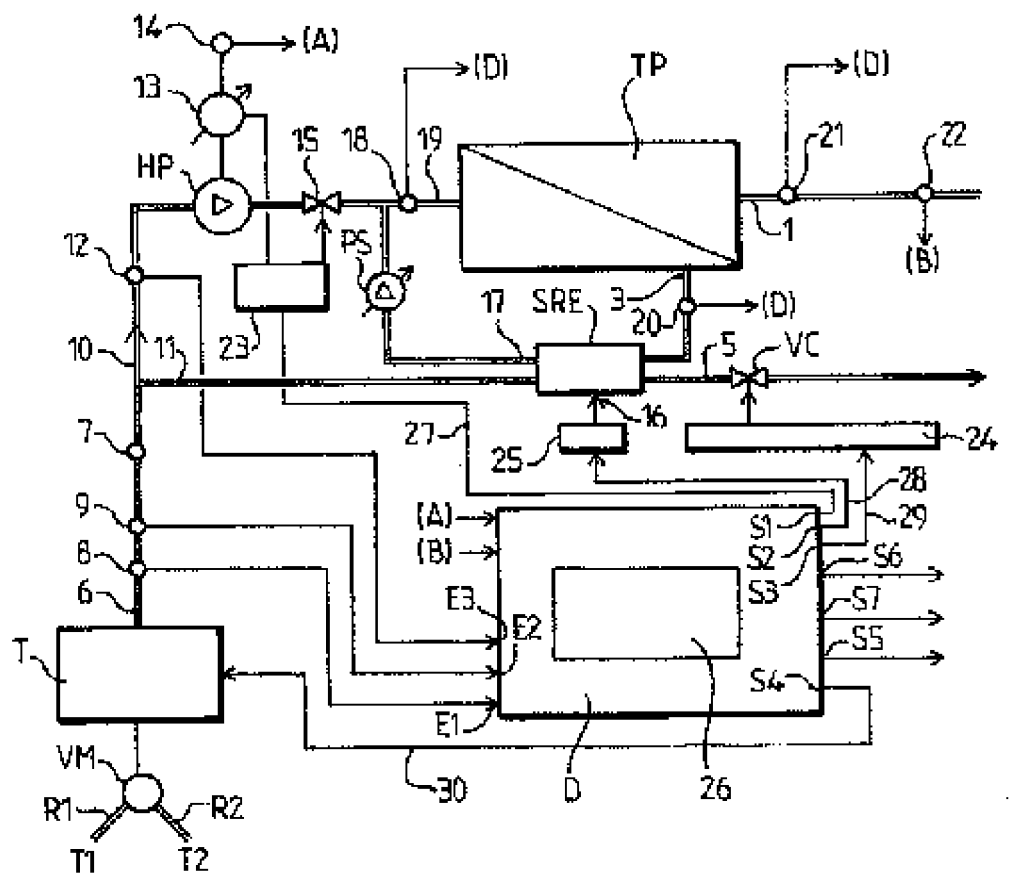
FIG. 2 is a more detailed diagram of the plant according to the invention.

FIG. 2 is a diagram similar to that of FIG. 1, but more detailed, of a plant according to the invention. The elements that are identical or similar to those of FIG. 1 are designated by the same references without their description being repeated.

The pretreatment unit T can be fed from several resources R1, R2 which arrive at a mixing valve VM the outlet of which feeds the unit T. The mixing valve VM makes it possible to adjust, in the outlet flow rate, the mixture ratio, that is to say the proportion of each of the resources R1, R2 that may have different temperatures and salinity ratios.

The total flow rate of water pretreated by the unit T flows in a duct 6 fitted with a flowmeter 7, a probe 8 for measuring the salinity ratio, and a probe 9 for measuring temperature of the pretreated water.

Downstream of the sensors consisting of the flowmeter 7 and the probes 8 and 9, the duct 6 divides into two ducts 10, 11. The duct 10 is connected to the inlet of the pump HP. A flowmeter 12 is installed on this duct 10. The pump HP is driven by an adjustable-speed electric motor 13. A sensor 14 makes it possible to measure the active power and the electric energy consumed by the motor 13. The signal from the sensor 14 is sent to an input A of a control D which will be dealt with below. The outlet of the pump HP is connected to the inlet of the membrane unit TP by means of an adjustable valve 15. The flow rate of filtrate 22 can be adjusted by acting on the speed of the motor 13 and/or on the aperture of the valve 15. The duct 11 diverts a portion of the pretreated water, unpressurized, to the energy collector SRE which comprises a control means 16 for the value of the concentrate/treated-water mixture delivered to the outlet 17 connected to the pump PS. A pressure sensor 18 is placed at the inlet of the unit TP on a duct 19 which combines the flows originating from the valve 15 and from the pump PS. The signal from the sensor 18 is sent to an input of the control D.

Another pressure sensor 20 is placed at the concentrate outlet of the unit TP. The filtrate outlet 1 is fitted with a pressure sensor 21 and with a flowmeter 22 supplying the flow rate of treated water.

Since the input parameters of the plant may vary in an uncontrolled manner, control loops are installed in order to keep the operation of the plant stable. In FIG. 2, three control loops are schematically represented: one loop 23 for adjusting the flow rate of filtrate, the outputs from this loop acting on the adjustable valve 15 and/or on the variable-speed motor 13; one control loop 24 for controlling the conversion ratio of the system acting on the valve VC in order to maintain a conversion ratio corresponding to a setpoint entered into the loop 24; and one control loop 25 for controlling the energy collector in order to control the concentrate/pretreated-water mixture in flow-rate conditions in tune with a setpoint supplied by the loop 25.

According to the invention, the plant comprises the secondary control D comprising computing means 26, in particular consisting of a microcomputer, programmed to determine, based on the operating conditions of the plant supplied by the sensors, a combination of setpoint values comprising the flow rate of filtrate; this setpoint value is delivered to an output S1 of the control linked via a conductor 27 to the input of the flow-rate setpoint of the loop 23.

The secondary control D delivers to another output S2 a setpoint value for the mixture ratio of the energy collector SRE. The output S2 is connected via a conductor 28 to the setpoint input of the loop 25.

On another output S3, the secondary control D supplies a setpoint value for the conversion ratio and the adjustment of the valve VC. This output S3 is connected via a conductor 29 to the setpoint input of the loop 24.

The secondary control D determines the combination of the three setpoint values mentioned above, which makes it possible to minimize the energy consumption of the system, these setpoint values being situated within limits ensuring the quantities and qualities of water produced, and the behavior of the equipment of the plant.

When several resources R1, R2 are available, provision is made, on the secondary control D, of an output S4 delivering a setpoint of mixture ratios of the various resources, which is combined with the setpoint values of the outputs S1-S3 in order to minimize the energy consumption. The setpoint of the output S4 is communicated to the setpoint input of the control loop for controlling the valve VM via a conductor 30.

The secondary control D comprises several inputs for the various operating parameters, notably an input E1 for the salinity ratio supplied by the probe 8 connected to this input E1; an input E2 connected to the probe 9 for collecting the temperature of the water to be treated; and an input E3 for the value of the flow rate supplied by the flowmeter 12.

The active power and electric energy measurement, supplied by the sensor 14, is sent, via a connection not shown, to the input A of the control D, while the value of flow rate of treated water supplied by the flowmeter 22 is sent, via a connection not shown, to the input B of the secondary control D.

The secondary control D is also supplied, on other inputs not shown, with the flow rates:
at the inlet of the high-pressure stage, that is to say
at the inlet of the unit TP;
at the inlet of the pressurization pump PS;
at the outlet of the high-pressure stage, that is to say at the outlet 3 of the unit TP;
at the discharge of the concentrate, that is to say downstream of the valve VC.

The control D also receives as an input the values of the pressures:
at the inlet of the pump HP;
at the inlet of the membrane unit TP (value supplied by the sensor 18);
at the inlet of the pressurization pump PS;
at the outlet of the high-pressure stage, that is to say at the outlet of the membrane unit TP for the filtrate (sensor 21) and for the concentrate (sensor 20);
at the discharge of the concentrate, downstream of the valve VC.

The programming of the computation means 26 takes account of the performance and efficiency curves of all of the equipment of the plant; pump, membrane, energy collector, measured during commissioning tests or according to the manufacturers' documentation.

The computation means 26 are also programmed to determine the permeability Lp of the membranes of the unit TP based on the measurements of flow rates and pressures of the inlet water, of the filtrate and of the concentrate, of the temperature and of the salinity ratio of the water. This characteristic magnitude of the state of the membranes is a slow-varying magnitude, unlike the other parameters, and can be used for several computation iterations. The control D delivers to an output S5 instructions for maintenance/replacement of membranes, as the result of the permeability computations made.

By virtue of this computation of the permeability Lp of the membrane, the secondary control D, in addition to the instructions emitted at the output S5, can emit alarms at an output S6 and reports at an output S7, for example weekly reports intended for those responsible for the plant. In particular, a replacement of the membranes may be proposed, the mathematical model for minimizing the cost of energy consumed having revealed that the replacement of the membranes has become of greater value than continuing to operate with the current membranes consuming more than new membranes.

The optimization, which consists in minimizing the use of energy necessary for the pumps, can be computed based on:
conditions of pressure and of flow rate of each of the pumps,
theoretical efficiency curves and efficiency curves measured during commissioning.

The optimal pressures and flow rates can be computed based on the temperature of the water to be treated and on the measured salinity ratio, on the computed permeability Lp and on three modulatable parameters, namely the flow rate of filtrate, the mixture ratio of the collector SRE, and the conversion ratio (and if necessary the temperature and salinity of the pretreated water).

This economical optimization takes account of the physical constraints of the plant: the range of variation of the modulatable parameters, behavior of the equipment.

The resolution of this economic optimization, after several iterations, provides as output data, at the outputs S1, S2, S3 and optionally S4, the best combination of the modulatable elements to be applied to the plant to minimize the energy consumed.

The inaccuracies of measurement and of computation are corrected on the one hand by virtue of the iterations of the optimization computation means, and by comparing the measurement of energy consumed with the expected results.

The secondary control D fulfills two functions:
a first function consists in a short-term minimization of energy consumption by acting at least on the following three setpoints: mixture ratio within the energy collector; conversion ratio by virtue of the valve VC; flow rate of the high-pressure pump HP by action on the valve 15 and/or on the speed variation of the motor 13 driving the pump HP;
the second function being a medium-to-long-term minimization by guiding the maintenance of the plant and the strategy for replacing the equipment that influences the energy consumption.

The computation means 26 of the secondary control D are programmed according to a mode system which makes it possible to give a priority to the responses of the control D and to its action on the plant as a function of the local constraints:

priority to flow rate of filtrate, or priority to flow rate of pretreatment, or priority to quality of treated water.

Figure 3:
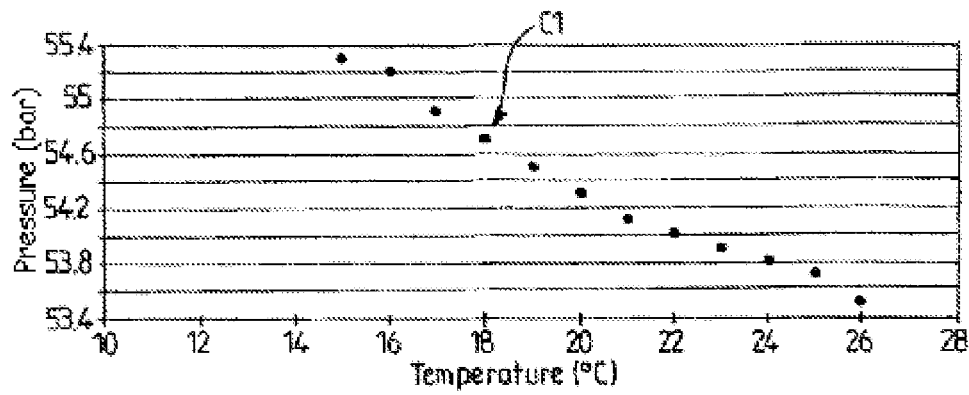
FIG. 3 is a diagram illustrating the variation in feed pressure of a membrane unit as a function of the temperature of the water to be treated.

In order to illustrate the relationship that exists between the various parameters, the curve C1 of FIG. 3 shows the change in pressure, shown on the Y axis, at the inlet of the membrane unit TP as a function of the temperature of the water to be treated. This curve depends on the plant, notably on the type of reverse-osmosis membrane used, and is associated with the viscosity of the water and with the hydraulic characteristics of the desalination plant. Overall, it appears that the pressure reduces as a function of the temperature, this pressure being approximately 55.2 bar for a temperature of 16° C. and approximately 53.5 bar for a water temperature of 26° C.

Figure 4:
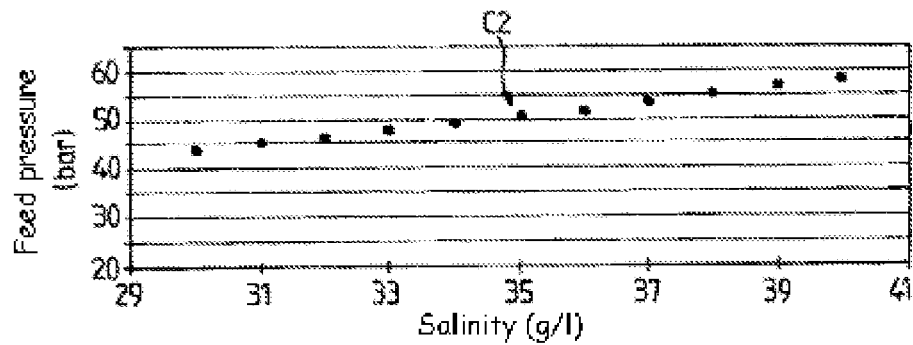
FIG. 4 is a diagram illustrating the variation in the feed pressure of the membrane unit as a function of salinity, shown on the X axis, of the water to be treated.

FIG. 4 represents a curve C2 which illustrates the relationship between the feed pressure (shown on the Y axis) of the unit TP, and the salinity expressed in g/L (grams/liter), shown on the X axis. This relationship is associated with the osmotic pressure generated by the salts that are present in the water, and it is also a function of the hydraulic conditions of the system. The pressure increases with the salinity and passes from approximately 44 bar for a salinity of approximately 30 g/L, to a pressure of approximately 58 bar for a salinity of approximately 40 g/L.

Figure 5:
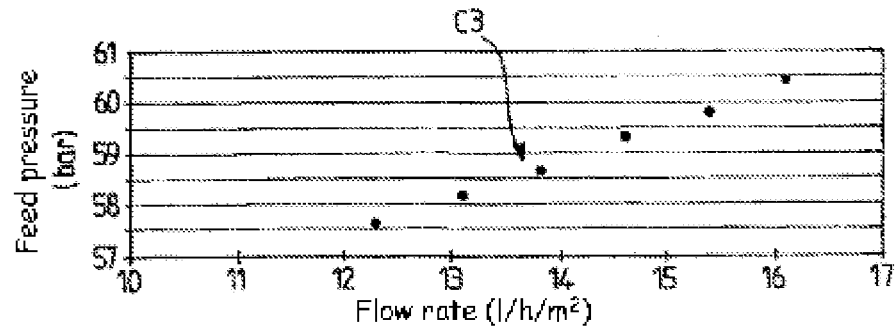
FIG. 5 is a diagram illustrating the variation of the feed pressure shown on the Y axis, as a function of the flow rate of the filtrate shown on the X axis.

FIG. 5 illustrates, by the curve C3, the variation in feed pressure, shown on the Y axis, as a function of the flow rate of filtrate, shown on the X axis, the salinity ratio and the conversion ratio being fixed. The flow rate of filtrate is expressed in L/h/m². In this case, for a defined salinity of water, the parameter to be taken into account is the permeability of the membrane, associated with the hydraulic conditions. The curve C3 shows that the feed pressure increases when the flow rate increases.

The secondary control D has been assessed on a reverse-osmosis plant prototype according to the diagram of FIG. 2.

The parameters that can influence the operation of the plant are controlled on this prototype.

First Series of Tests

During the tests, the plant operates in a stable manner. Table 1 which follows summarizes the conditions and results of the first series of tests on a prototype plant fitted with the secondary control.

TABLE 1

| | Initial conditions | Conditions 1: generation of an increase in salinity | Condition 1 after stabilization | Conditions 2: generation of an increase in salinity | Condition 2 after stabilization |
|---|---|---|---|---|---|
| Temperature (° C.) | 20 | 20 | 20 | 20 | 20 |
| Salinity of the pretreated water (g/L) | 37.05 | 37.6 | 37.6 | 39.5 | 39.5 |
| Flow-rate setpoint (m³/h) | 3.4 | 3.4 | 3.4 | 3.4 | 3.4 |
| Conversion setpoint (%) | 45 | 45 | 43.6 | 43.6 | 41.3 |
| Feed pressure measured (bar) | 55.6 | 56.04 | 55.6 | 57.16 | 55.6 |
| SRE leakage flow rate % | 0 | 0 | 6 | 6 | 0 |
| Measured concentrate pressure (bar) | 54.4 | 54.8 | 54.7 | 56.26 | 54.7 |
| Measured filtrate pressure (bar) | 0.1 | 0.1 | 0.1 | 0.1 | 0.1 |
| Mode | | Filtrate flow rate limiting | Filtrate flow rate limiting | Filtrate flow rate limiting | Filtrate flow rate limiting |
| Energy consumed kWh/m³ | 2.17 | 2.19 | 2.17 | 2.23 | 2.17 |

Initial Conditions:

In these initial conditions, the prototype is fed by a seawater pretreatment system, and operates at a flow rate of 3.4 m³/h (the filtrate production flow rate), with a conversion ratio setpoint of 45%. The salinity of the pretreated seawater is 37.05 g/L and its temperature is 20° C.

The energy consumption of the plant is equal to the energy consumed by the pump HP, or 2.17 kWh/m$^3$, increased by the electric consumption of the pretreatment (the unit T) which gives a consumption of 2.33 kWh/m$^3$ of filtrate produced.

Conditions 1:

The Conditions 1 column corresponds to a modification of the salinity of the water at the intake of the plant, a modification intentionally made in order to note the behavior of the plant with secondary control.

The salinity passes from 37.05 to 37.6 g/L, which causes a correction via the primary control loops, in order to keep the flow rate of filtrate and the conversion of the system stable. This correction is reflected by an increase in the feed pressure which passes from 55.6 to 56.04 bar to maintain the flow rate of filtrate and the conversion ratio. The measured concentrate pressure passes from 54.4 to 54.8 bar and the energy consumed increases to 2.19 kWh/m$^3$.

The secondary control D begins by evaluating, as a function of the adopted mode (priority to flow rate of filtrate), the possible actions on the plant. In order to minimize electricity consumption, the secondary control D will act on the conversion ratio of the plant which reduces from 45 to 43.6%, according to the third column "Condition 1 after stabilization", first of all by minimizing the salinity generated by the energy collector SRE.

The setpoint of mixture flow rate of the collector SRE is reduced by means of a primary control loop of the pump PS, which corresponds to the leakage flow rate of 6% in the third column after stabilization of the system. The salinity drops at the outlet of the SRE collector, reducing the impact of the increase in salinity of the untreated water, and returning the plant to its initial operating pressure of 55.6 bar. The energy consumed by the high-pressure pump HP returns to the initial value of 2.17 kWh/m$^3$.

Conditions 2:

The salinity of the pretreated water is increased again to pass from 37.6 to 39.5 g/L as indicated in the fourth column of Table 1. The prototype plant is still in priority to filtrate production mode. According to column 4, the primary control loops cause an increase in the feed pressure to the value of 57.16 bar in order to maintain production, which causes an increase in the power consumed to 2.23 kWh/m$^3$ by the pump HP.

In this case, the secondary control D evaluates the means of action. The collector SRE having reached its maximum deconcentration flow rate, the secondary control D modifies the setpoint of the conversion ratio of the whole plant, that is to say the setpoint of the valve VC. The conversion ratio passes to the value of 41.3% as is shown in the last column of Table 1.

After stabilization, the prototype plant is returned to its initial operating conditions with a feed pressure of 55.6 bar and energy consumed by the pump HP of 2.17 kWh/m$^3$.

Second Series of Tests

Table 2 below summarizes the conditions and results of the tests of the prototype plant with secondary control, during a second series of tests.

TABLE 2

| | Initial conditions | Conditions 3: generation of a reduction in temperature | Condition 3 after stabilization | Conditions 4: generation of aging of the reverse-osmosis membranes | Conditions 4 after chemical washing |
|---|---|---|---|---|---|
| Temperature (° C.) | 20 | 15.5 | 15.5 | 15.5 | 15.5 |
| Salinity of the pretreated water (g/L) | 37.05 | 37.05 | 37.05 | 37.05 | 37.05 |
| Flow-rate setpoint (m$^3$/h) | 3.4 | 3.4 | 3.35 | 3.35 | 3.35 |
| Conversion setpoint (%) | 45 | 45 | 44.3 | 44.3 | 44.3 |
| Measured feed pressure (bar) | 55.6 | 56.2 | 55.25 | 61.1 | 55.2 |
| SRE leakage flow rate % | 0 | 0 | 0 | 0 | 0 |
| Measured concentrate pressure (bar) | 54.7 | 55.7 | 54.35 | 58.6 | 54.2 |
| Measured filtrate pressure (bar) | 0.1 | 0.1 | 0.1 | 0.1 | 0.1 |
| Mode | | Filtrate flow rate not limiting Resource limiting | Filtrate flow rate not limiting Resource limiting | Filtrate flow rate limiting | Filtrate flow rate limiting |
| Energy consumed kWh/m$^3$ | 2.17 | 2.19 | 2.17 | 2.37 | 2.17 |

Conditions 3:

The second column of Table 2 contains the conditions of a test for which the temperature of the feed water is reduced by 20° C. to 15.5° C., by means of a heat exchanger and a cooling unit. The values given in the second column correspond to those induced by the primary control loops before intervention of the secondary control and stabilization, which corresponds to the third column.

According to the second column, in order to maintain the production flow rate, the primary control loops adjust the feed pressure of the plant which therefore passes from 55.6 bar to 56.2 bar causing an increase in the energy consumed by the pump HP from 2.17 to 2.19 kWh/m$^3$ of filtrate.

In this example, priority is given to the resource, the production flow rate not having priority. In this case, the secondary control D will modify the flow rate of filtrate which passes from 3.4 to 3.35 m$^3$/h, the conversion setpoint reducing from 45% to 44.3%. The energy consumption returns to the initial value of 2.17 kWh/m$^3$ after stabilization, as indicated in column 3.

Conditions 4:

The fourth example, corresponding to the fourth column of Table 2, relates to the aging of the reverse-osmosis membranes. This aging is reflected here by a loss of permeability with an increase in the pressure loss of the membranes, which is reflected by the difference between the feed pressure of 61.1 bar and the concentrate pressure of 58.6 bar at the outlet of the membrane unit TP.

In this case, the secondary control D is based not only on the direct input data but also on the computation results of the membrane identifying a significant drop in permeability. The secondary control will recommend that the operator carry out a chemical washing. Column 5 shows that after completion of the chemical washing improving the permeability of the reverse-osmosis membranes, there is a return to an operating pressure of 55.2 bar (feed pressure) and an energy consumption of 2.17 kWh/m$^3$ comparable to those of column 3 (conditions 3 after stabilization), with feed water at 15.5°.

Figure 6:
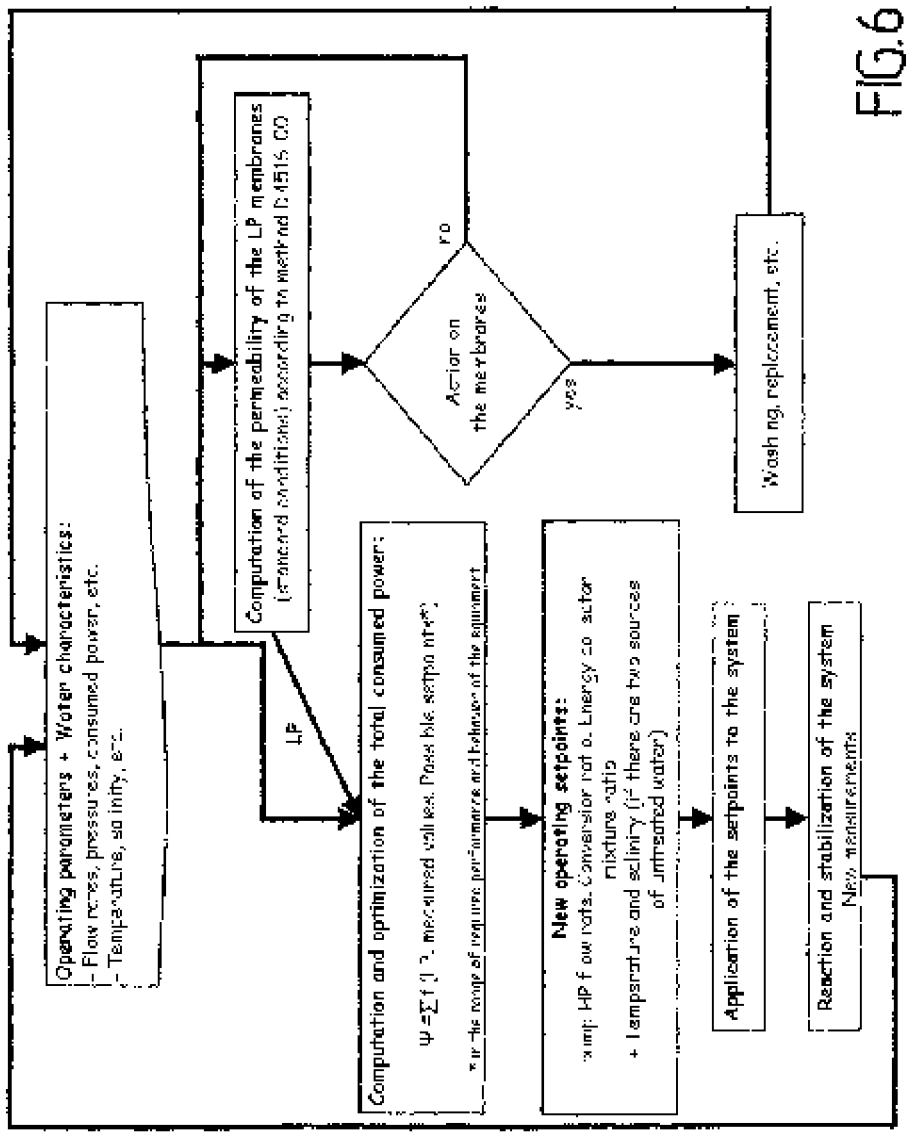
FIG. 6 is a flowchart of the control.

FIG. 6 shows a flowchart recapitulating the operation of the control.

The osmosis water desalination plants treat considerable volumes each day, on average of the order of 120 000 m$^3$ per day, so that the energy savings provided by the invention are considerable in absolute value, while the relative value is of the order of a few %.

Advantageously, the computation means are programmed to determine the three optimal setpoints (pump HP flow rate, mixture ratio of the energy collector, conversion ratio) minimizing the electric power consumed in reverse osmosis as follows.

We have the following theoretical computation formula:
Electric power consumed by pumps=Function (three setpoints, measured operating parameters).

The possible ranges of variation of the three setpoints are known (limitation by process guarantees and capacities of the equipment).

At regular intervals, a search for the optimal combination of the three setpoints is carried out in the following manner:

Each of the variation ranges of the three setpoints is dichotomized, or more generally divided, into n possible values (e.g. for a possible flow rate of 100 to 110, a hundred values are considered: 100, 100.1, 100.2 . . . 109.9, 110).

The theoretical computation of the consumed power is made with the measured operating parameters and the n*n*n (n to the power of 3) combination possibilities of the three setpoints.

The combination of the setpoints giving the minimal theoretical power is adopted and applied to the system.

An additional loop of the main logic loop compares the theoretical result obtained with the actual consumption measured on the system. In the event of considerable difference, an alarm is emitted leading to a verification of the equipment of the process or at regular intervals to a resetting of the computation formulas taking account of the change in the characteristics of the equipment relative to their assigned values that were used to establish the initial computation formula.

The invention claimed is:

1. A reverse-osmosis water desalination plant comprising:
a reverse-osmosis membrane unit comprising an inlet, a first outlet for delivering filtered water, and a second outlet for delivering a concentrate,
a duct through which passes the total flow rate of resource water, which is to be treated by the membrane unit,
said duct being divided into a first duct and a second duct, a first portion of the resource water flowing through the first duct, which connects the first portion of the resource water to an inlet of at least one high-pressure pump, an outlet of the high-pressure pump connecting the first portion of the resource water to the inlet of the membrane unit, and a second portion of the resource water flowing through the second duct,
a means for adjusting a flow rate of the high-pressure pump, this means comprising an adjustable valve installed on the outlet of the high-pressure pump and/or a drive motor for driving the high-pressure pump at variable speed,
an energy collector configured to transfer pressure of the concentrate leaving the membrane unit to the second portion of the resource water and to mix a first portion of the concentrate with the second portion of the resource water, the energy collector comprising:
a first inlet, the second duct diverting the second portion of the resource water unpressurized through the first inlet,
a second inlet for receiving the concentrate leaving the membrane unit,
a first outlet for delivering a mixture of the first portion of the concentrate and of the second portion of the resource water, and being connected to an inlet of a booster pump, an outlet of the booster pump being connected to the inlet of the membrane unit downstream of the high-pressure pump,
a control means for adjusting the ratio of the mixture between the first portion of the concentrate and the second portion of the resource water, wherein said control means comprises a mixing valve,
a second outlet for discharge of a second portion of the concentrate which is no longer pressurized,
an adjustable control valve fitted to the second outlet of the energy collector, wherein the adjustable control valve is positioned to adjust a conversion ratio of the reverse-osmosis desalination plant,
a plurality of sensors positioned to generate sensor signals based on a plurality of detected operating parameters, the plurality of operating parameters comprising pressure, flow rate, temperature, and salinity ratio,
control loops that maintain the various operating parameters detected by the sensors at a setpoint value,
a programmable controller coupled to the sensors to receive the sensor signals and configured to determine, based on the sensor signals, a combination of setpoint values for:
the flow rate of the high-pressure pump,
the ratio of the mixture between the first portion of the concentrate and the second portion of the resource water,
and the conversion ratio,
which makes it possible to minimize the energy consumption of the reverse-osmosis desalination plant, these optimal setpoint values being situated within limits ensuring the quantities and qualities of water produced and operability of the reverse-osmosis water desalination plant,
wherein the programmable controller outputs said optimal setpoint values to said control loops to adjust one or more of the flow rate of the high-pressure pump, the control means for adjusting the ratio of the mixture, and the adjustable control valve, so as to minimize energy consumption of the reverse osmosis desalination plant.

2. The plant as claimed in claim 1, wherein the programmable controller, in order to determine the three optimal setpoint values minimizing the energy consumption of the reverse-osmosis water desalination plant, is programmed to:
execute, at regular intervals, a search for an optimal combination of the three optimal setpoint values, each optimal setpoint value having an associated range of possible variations, with each range for each of the three optimal setpoint values being divided into n possible values;

carry out a theoretical computation of the energy consumption with the operating parameters and the n*n*n (n to the power of 3) combination possibilities of the three optimal setpoint values, and the combination of the optimal setpoint values giving a minimal theoretical energy consumption is adopted and applied to the reverse-osmosis water desalination plant.

3. The plant as claimed in claim 2, wherein the programmable controller is programmed with an additional loop of the control loops for comparing the energy consumption of the theoretical computation with an actual consumption measured on the reverse-osmosis water desalination plant, and for emitting an alarm if there is a considerable difference, leading to a verification of the reverse-osmosis water desalination plant or, at regular intervals, to a resetting of computation formulas taking account of a change in characteristics of the reverse-osmosis water desalination plant relative to corresponding assigned values that were used to establish initial computation formulas.

4. The plant as claimed in claim 1, comprising at least two sources of salt water having different salinity ratios and/or temperatures, and an adjustable valve for adjusting a mixture ratio of the sources of salt water, wherein the programmable controller is programmed to determine an optimal setpoint value for the mixture ratio of the sources of salt water in order to reduce the energy consumption, this optimal setpoint value being applied to the adjustable valve of for adjusting the mixture ratio.

5. The plant as claimed in claim 1, wherein the programmable controller is programmed to determine the permeability of the membrane unit based on flow-rate, pressure, temperature and salinity parameters of the resource water, of the filtered water, and of the concentrate, and to emit an indication or an alarm when the permeability falls below a limit requiring a cleaning or a replacement in order to minimize the use of energy.

6. The plant as claimed in claim 1, wherein the programmable controller is programmed to take account of efficiency and performance curves of all of the equipment of the reverse-osmosis water desalination plant, including the high-pressure pump, the membrane unit, and the energy collector.

7. The plant as claimed in claim 1, wherein the programmable controller receives inputs at least for the following operating parameters:
water temperature at the first inlet of the energy collector, salinity ratio of the resource water,
flow rates of the resource water at the inlet of the membrane unit, at the inlet of the high-pressure pump, at the inlet of the booster pump, at the first outlet of the membrane unit, and at the second outlet of the membrane unit;
pressures at the inlet of the high-pressure pump, at the inlet of the membrane unit, at the inlet of the booster pump, at the first outlet of the membrane unit, and at the second outlet of the membrane unit;
flow rate at the first outlet of the membrane unit, and active power and electric energy consumed by the high-pressure pump.

8. The plant as claimed in claim 1, wherein the programmable controller is programmed according to a mode system which makes it possible to give priority to responses of the control loops and to actions of the control loops on the reverse-osmosis water desalination plant according to a priority given to a flow rate of the filtered water, or to a quality of the filtered water.

9. The plant as claimed in claim 1, further including a pretreatment unit which treats the resource water before division into the first and second ducts.

10. A reverse-osmosis water desalination plant comprising:
a reverse-osmosis membrane unit having a membrane unit inlet and a membrane unit outlet, wherein both the membrane unit inlet and the membrane unit outlet are configured to be pressurized;
a high-pressure pump having a pump inlet and a pump outlet, the pump outlet being coupled to the membrane unit inlet;
a duct configured to carry resource water to be treated by the reverse-osmosis membrane unit, the duct being divided into a first duct and a second duct, the first duct being coupled to the pump inlet, wherein a first portion of the resource water flowing through the first duct and a remaining portion of the resource water flowing through the second duct;
a means for adjusting the flow rate of the high-pressure pump;
an energy collector having a first inlet, a first outlet, a second inlet, and a second outlet, wherein the first inlet is coupled to the membrane unit outlet to receive concentrate, the second inlet is coupled to the second duct to receive the remaining portion of the resource water into the energy collector, the first outlet is coupled to the membrane unit inlet, downstream of the high-pressure pump, through a booster pump, to provide the membrane unit inlet with a mixture of a first portion of the concentrate and of the remaining portion of the resource water, and the second outlet discharges the remaining portion of the concentrate, wherein the energy collector is configured to mix the first portion of the concentrate with the remaining portion of the resource water and to transfer the pressure of the concentrate leaving the membrane unit to the mixture of the first portion of the concentrate and the remaining portion of the resource water;
an adjustable control valve coupled to the second outlet of the energy collector, wherein adjustment of the adjustable control valve changes a conversion ratio of the reverse-osmosis water desalination plant;
a plurality of sensors positioned to generate sensor signals based on a plurality of operating parameters, including pressure, flow rate, temperature, salinity ratio;
one or more control loops configured to maintain adjustable elements at a setpoint value; and
a programmable controller coupled to the sensors to receive the sensor signals and configured to determine, based on the sensor signals, a combination of setpoint values for:
the flow rate of the high-pressure pump,
the mixture ratio of the energy collector, and
the conversion ratio,
and configured to insert the determined setpoint values into the control loops and to maintain the determined setpoint values within predetermined limits, the predetermined limits set to ensure the quantities and qualities of water produced and the behavior of the reverse-osmosis water desalination plant.

* * * * *